(12) United States Patent
Liew

(10) Patent No.: US 12,079,327 B2
(45) Date of Patent: Sep. 3, 2024

(54) PROCESSING APPARATUS, SECURITY CONTROL METHOD, AND NON-TRANSITORY COMPUTER READABLE MEDIUM

(71) Applicant: NEC Corporation, Tokyo (JP)

(72) Inventor: Seng Pei Liew, Tokyo (JP)

(73) Assignee: NEC CORPORATION, Tokyo (JP)

( * ) Notice: Subject to any disclaimer, the term of this patent is extended or adjusted under 35 U.S.C. 154(b) by 200 days.

(21) Appl. No.: 17/801,574

(22) PCT Filed: Mar. 17, 2020

(86) PCT No.: PCT/JP2020/011823
§ 371 (c)(1),
(2) Date: Aug. 23, 2022

(87) PCT Pub. No.: WO2021/186589
PCT Pub. Date: Sep. 23, 2021

(65) Prior Publication Data
US 2023/0099751 A1    Mar. 30, 2023

(51) Int. Cl.
*G06F 21/53* (2013.01)
*G06F 9/30* (2018.01)

(52) U.S. Cl.
CPC .......... *G06F 21/53* (2013.01); *G06F 9/30032* (2013.01)

(58) Field of Classification Search
CPC .................................................. G06F 9/30032
(Continued)

(56) References Cited

U.S. PATENT DOCUMENTS

| 5,642,500 A * | 6/1997 | Inoue | G06F 9/3806 |
| | | | 712/239 |
| 10,984,096 B2 * | 4/2021 | Yamada | G06F 21/554 |

(Continued)

FOREIGN PATENT DOCUMENTS

| CN | 110597571 A | 12/2019 |
| EP | 0320098 A2 | 6/1989 |

(Continued)

OTHER PUBLICATIONS

JP Office Action for JP Application No. 2022-546103, mailed on Aug. 15, 2023 with English Translation.

(Continued)

*Primary Examiner* — Samson B Lemma
(74) *Attorney, Agent, or Firm* — Sughrue Mion, PLLC

(57) ABSTRACT

In a processing apparatus, a determination unit determines whether a jump destination address of a jump instruction in a process execution program being executed corresponds to a sensitive address region. When the determination unit determines that the jump destination address does not correspond to the sensitive address region, the security control unit executes control to allow the execution of the jump instruction and record a jump source address and the jump destination address of the jump instruction in jump history information as a jump execution record. When it is determined that the jump destination address corresponds to the sensitive address region, the security control unit searches for a "suspicious record" in the jump history information. The suspicious record is a jump execution record corresponding to an "unusual jump destination address".

9 Claims, 7 Drawing Sheets

(58) Field of Classification Search
USPC .......................................................... 726/22
See application file for complete search history.

(56) References Cited

U.S. PATENT DOCUMENTS

| | | | |
|---|---|---|---|
| 11,194,900 B2* | 12/2021 | Loman | .................. G06F 21/566 |
| 2007/0250703 A1* | 10/2007 | Giraud | .................... G06F 21/55 |
| | | | 713/154 |
| 2008/0005797 A1* | 1/2008 | Field | .................... G06F 21/575 |
| | | | 726/24 |
| 2008/0040812 A1* | 2/2008 | Giraud | .................. G06F 21/556 |
| | | | 711/E12.091 |
| 2015/0095628 A1 | 4/2015 | Yamada et al. | |
| 2016/0283714 A1* | 9/2016 | LeMay | .................. G06F 21/52 |
| 2017/0068709 A1 | 3/2017 | Dasgupta et al. | |
| 2018/0039776 A1* | 2/2018 | Loman | .................. G06F 21/566 |
| 2019/0042730 A1* | 2/2019 | Yamada | ................ G06F 21/554 |
| 2019/0050566 A1* | 2/2019 | LeMay | .................. G06F 21/52 |
| 2019/0095612 A1 | 3/2019 | Singh | |
| 2022/0075868 A1* | 3/2022 | Loman | .................... G06F 21/54 |

FOREIGN PATENT DOCUMENTS

| | | | |
|---|---|---|---|
| JP | 2006-048257 A | 2/2006 | |
| JP | 2006-106956 A | 4/2006 | |
| WO | WO-2004013755 A1 * | 2/2004 | .......... G06F 21/566 |
| WO | 2014/189510 A1 | 11/2014 | |
| WO | WO-2019158020 A1 * | 8/2019 | ............. G06F 21/52 |

OTHER PUBLICATIONS

Ishii, "The Toshiba technical public presentation collection", Toshiba Corporation, vol. 20-16, pp. 137-pp. 142., Mar. 28, 2002.
International Search Report for PCT Application No. PCT/JP2020/011823, mailed on Aug. 4, 2020.

* cited by examiner

| Function_name | start_address | end_address |
|---|---|---|
| Show_sensitive_data | 0x00200634 | 0x0020067e |

Fig. 2

| Function_name | start_address | end_address |
| --- | --- | --- |
| Timer | 0x00200338 | 0x00200344 |
| Actuator | 0x00200348 | 0x002003c6 |
| Actuator_timer | 0x002003f8 | 0x00200488 |
| Command_thread | 0x0020048c | 0x002004ba |
| Servo_thread | 0x002004bc | 0x002004ea |
| Mutex | 0x002005d4 | 0x00200618 |
| Show_command | 0x0020069c | 0x002006f6 |
| fseek | 0x00201db8 | 0x00201eac |
| strlen | 0x00201278 | 0x002012b4 |
| strcat | 0x002012b6 | 0x002012cc |
| strcmp | 0x00201450 | 0x002014ca |
| fclose | 0x00201a1e | 0x00201a68 |

Fig. 4

PROCESSING APPARATUS, SECURITY CONTROL METHOD, AND NON-TRANSITORY COMPUTER READABLE MEDIUM

This application is a National Stage Entry of PCT/JP2020/011823 filed on Mar. 17, 2020, the contents of all of which are incorporated herein by reference, in their entirety.

TECHNICAL FIELD

The present disclosure relates to a processing apparatus, a security control method, and a non-transitory computer readable medium.

BACKGROUND ART

Attackers attacking a processing apparatus may exploit, for example, a "buffer overflow" found in a program to change a jump destination address of a "jump instruction (e.g., a branch processing instruction") in the program to thereby perform illegal activities such as changing a program execution flow (control flow) and stealing confidential data.

In order to defend against such an attack, a technique disclosed in, for example, Patent Literature 1 executes security processing for confirming the validity of a branch destination address before branch processing is performed in a program being executed.

CITATION LIST

Patent Literature

Patent Literature 1: Japanese Unexamined Patent Application Publication No. 2006-106956

SUMMARY OF INVENTION

Technical Problem

However, in the technique disclosed in Patent Literature 1, security processing for confirming the validity of a branch destination address is performed every time the branch processing is executed, and thus an overhead of the processing apparatus may increase. For this reason, it is difficult to apply such a technique to an apparatus with low computing power such as an IoT (Internet of Things) device and an embedded device.

An object of the present disclosure is to provide a processing apparatus, a security control method, and a non-transitory computer readable medium that can reduce an overhead caused by security processing.

Solution to Problem

A first example aspect is a processing apparatus including:
determination means for determining whether a jump destination address of a jump instruction corresponds to an address region of security-sensitive functions based on sensitive address region information for defining the address region before execution of the jump instruction in a program being executed; and
  security control means for, when it is determined that the jump destination address does not correspond to the address region, executing control to allow the execution of the jump instruction and record a jump source address and the jump destination address of the jump instruction in jump history information as a jump execution record, whereas when it is determined that the jump destination address corresponds to the address region, searching for a suspicious record in the jump history information, the suspicious record being a jump execution record corresponding to an unusual jump destination address.

A second example aspect is a security control method including:
  determining whether a jump destination address of a jump instruction corresponds to an address region of security-sensitive functions based on sensitive address region information for defining the address region before execution of the jump instruction in a program being executed;
  when it is determined that the jump destination address does not correspond to the address region, executing control to allow the execution of the jump instruction and record a jump source address and the jump destination address of the jump instruction in jump history information as a jump execution record; and
  when it is determined that the jump destination address corresponds to the address region, searching for a suspicious record in the jump history information, the suspicious record being a jump execution record corresponding to an unusual jump destination address.

A third example aspect is a non-transitory computer readable medium storing a control program for causing a processing apparatus to execute processing including:
  determining whether a jump destination address of a jump instruction corresponds to an address region of security-sensitive functions based on sensitive address region information for defining the address region before execution of the jump instruction in a program being executed;
  when it is determined that the jump destination address does not correspond to the address region, executing control to allow the execution of the jump instruction and record a jump source address and the jump destination address of the jump instruction in jump history information as a jump execution record; and
  when it is determined that the jump destination address corresponds to the address region, searching for a suspicious record in the jump history information, the suspicious record being a jump execution record corresponding to an unusual jump destination address.

Advantageous Effects of Invention

According to the present disclosure, it is possible to provide a processing apparatus, a security control method, and a non-transitory computer readable medium that can reduce an overhead caused by security processing.

BRIEF DESCRIPTION OF DRAWINGS

FIG. 2 shows an example of sensitive address region information according to the first example embodiment.

FIG. 4 shows an example of white address information according to a second example embodiment.

DESCRIPTION OF EMBODIMENTS

Hereinafter, example embodiments will be described with reference to the drawings. Note that, in the example embodiments, the same or equivalent elements are denoted by the same reference signs, and repeated description will be omitted.

First Example Embodiment

<Configuration Example of Processing Apparatus>

Figure 1:
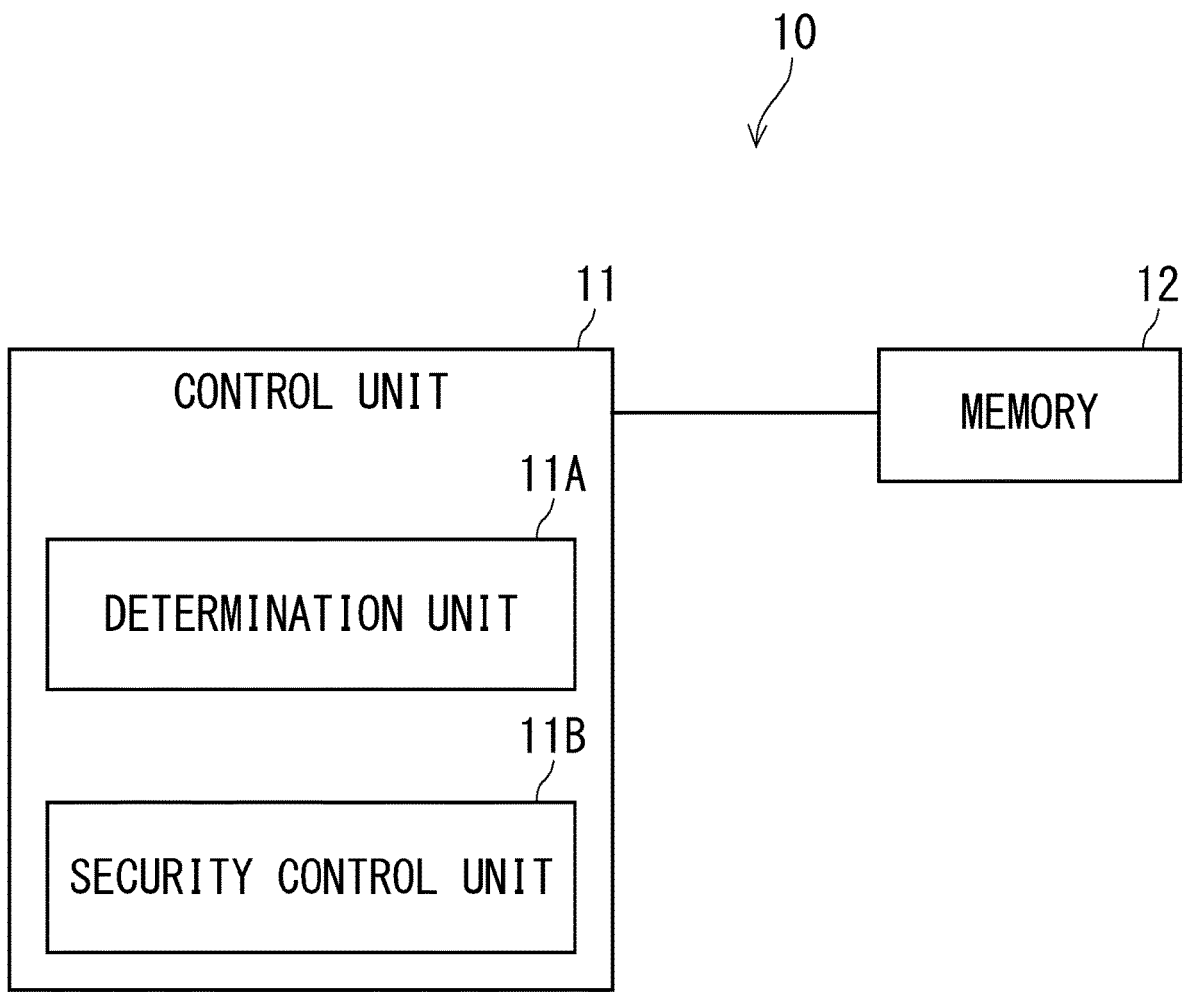
FIG. 1 is a block diagram showing an example of a processing apparatus according to a first example embodiment.

FIG. 1 is a block diagram showing an example of a processing apparatus according to a first example embodiment. A processing apparatus 10 shown in FIG. 1 is an apparatus that executes a program to be processed to execute a desired process. The processing apparatus 10 is, for example, an IoT (Internet of Things) device or an embedded device. In FIG. 1, the processing apparatus 10 includes a control unit 11 and a memory 12. The control unit 11 includes a determination unit 11A and a security control unit 11B. The control unit 11 may further include a process execution unit (not shown) that reads and executes a process execution program for executing the above-described desired process stored in the memory 12.

The determination unit 11A determines whether a "jump destination address" of a "jump instruction" in a process execution program being executed corresponds to a "sensitive address region" based on "sensitive address region information". The "sensitive address region information" is information (e.g., table) that defines an address region of security-sensitive functions. The address region of the security-sensitive functions is the above-described sensitive address region. This determination process is performed before the above jump instruction is executed. The "sensitive address region" is, for example, a memory area of the memory 12 corresponding to continuous addresses. That is, the "sensitive address region" can be defined by two addresses, which are a first address and an end address of the region. The "sensitive address region" may be determined in advance, for example, by a user or by a compiler. Here, the "jump instruction" includes a function or method call, a return from a function or method call, or a calculated jump.

FIG. 2 shows an example of the sensitive address region information according to the first example embodiment. The example of FIG. 2 shows that the "sensitive address region" is a region in which an address "0x00200634" is a first address (start address) and an address "0x0020067e" is an end address (last address).

Returning to the description of FIG. 1, when the determination unit 11A determines that a jump destination address does not correspond to the sensitive address region, the security control unit 11B allows execution of the jump instruction and executes control to record an address of the jump instruction (this address may be hereinafter referred to as a "jump source address") and the "jump destination address" in "jump history information" as a "jump execution record". The "jump history information" may hold a predetermined number of jump execution records in order from the newly recorded jump execution records, and old jump execution records exceeding the predetermined number may be sequentially deleted.

On the other hand, when it is determined that the jump destination address corresponds to the sensitive address region, the security control unit 11B searches the "jump history information" for a "suspicious record" which is the jump execution record corresponding to an "unusual jump destination address". That is, the security control unit 11B verifies the validity of the jump destination address in the jump history information. Here, the "unusual jump destination address" is, for example, an address other than the first address of the function. Then, when a suspicious record is found, the security control unit 11B may stop the execution of the currently running process execution program. On the other hand, when a suspicious record is not found, the security control unit 11B may allow the execution of the jump instruction and continue the execution of the process execution program. Also in this case, the security control unit 11B executes control to record the "jump execution record" in the "jump history information".

<Operation Example of Processing Apparatus>

Figure 3:
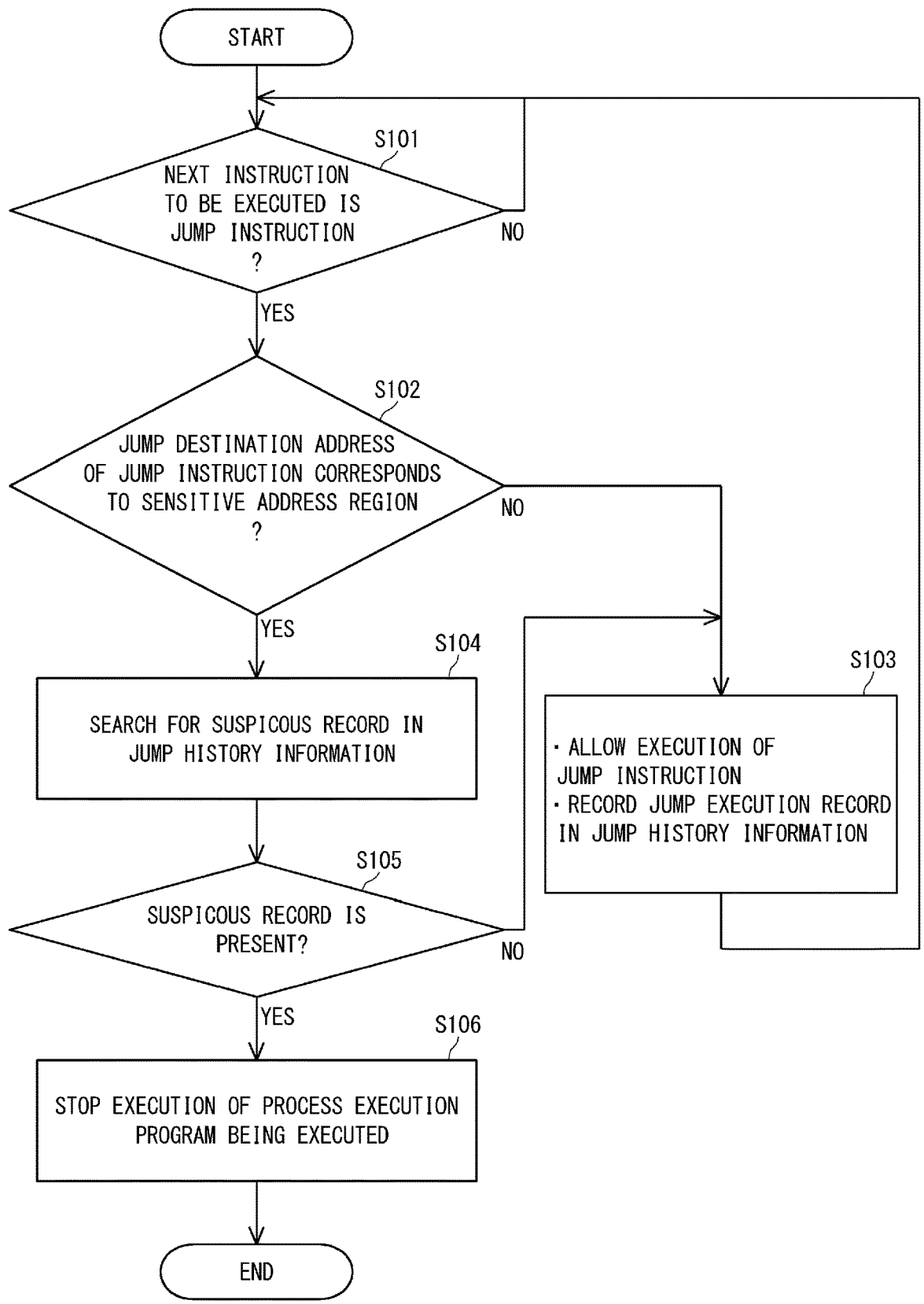
FIG. 3 is a flowchart showing an example of a processing operation of the processing apparatus according to the first example embodiment.

An example of the processing operation of the processing apparatus 10 having the above configuration will be described. FIG. 3 is a flowchart showing an example of a processing operation of the processing apparatus according to the first example embodiment. The flowchart shown in FIG. 3 starts when the next instruction to be executed in the process execution program being executed is a jump instruction. At this time, execution of this jump instruction is in a wait state.

The determination unit 11A waits until the next instruction to be executed in the currently executing process execution program is a jump instruction (Step S101: NO).

When the next instruction to be executed is a jump instruction (Step S101: YES), the determination unit 11A determines whether the jump destination address of the jump instruction corresponds to the sensitive address region based on the sensitive address region information (Step S102).

When the jump destination address of the jump instruction does not correspond to the sensitive address region (Step S102: NO), the security control unit 11B executes control to allow execution of the jump instruction and record the jump execution record in the jump history information (Step S103).

When the jump destination address corresponds to the sensitive address region (Step S102: YES), the security control unit 11B searches for a "suspicious record" in the "jump history information" (Step S104).

When a suspicious record is found (Step S105: YES), the security control unit 11B stops the execution of the currently running process execution program (Step S106).

When no suspicious record is found (Step S105: NO), the security control unit 11B allows the execution of the jump instruction and continues the execution of the process execution program, and executes control to record the "jump execution record" in the "jump history information" (Step S103).

With the above-described configuration of the processing apparatus 10, when the jump destination address does not correspond to the sensitive address region, the validity of the jump destination address is not verified, and thus an overhead caused by the security processing can be reduced. Further, with the above-described configuration of the processing apparatus 10, by appropriately setting the number of jump execution records held in the jump history information, it is possible to further reduce an overhead caused by the security processing.

Second Example Embodiment

A second example embodiment relates to an example of a method for searching a "suspicious record". A configuration of a processing apparatus according to the second example embodiment is the same as that of the processing apparatus 10 according to the first example embodiment, and thus a description thereof will be described with reference to FIG. 1.

In the processing apparatus 10 according to the second example embodiment, the security control unit 11B identifies a "suspicious record" based on "white address information". The "white address information" is information (e.g., table) that defines a first address of each function included in a process execution program. For example, the security control unit 11B identifies, as a suspicious record, a jump execution record that is included in the jump history information with a corresponding jump destination address not included in the white address information based on the white address information.

FIG. 4 shows an example of the white address information according to the second example embodiment. The white address information shown in FIG. 4 is shown in a table in which a function name (Function_name) of each function included in the process execution program is associated with a first address (start address) and an end address (last address) of a region in which the corresponding function is positioned (the region may be hereinafter referred to as "function position").

This white address information can be obtained from a control flow graph (CFG). That is, for example, a developer of the process execution program creates a control flow graph by applying an analysis tool to the process execution program, and creates white address information based on the control flow graph. This white address information is stored in the memory 12 of the processing apparatus 10 in advance.

Figure 5:
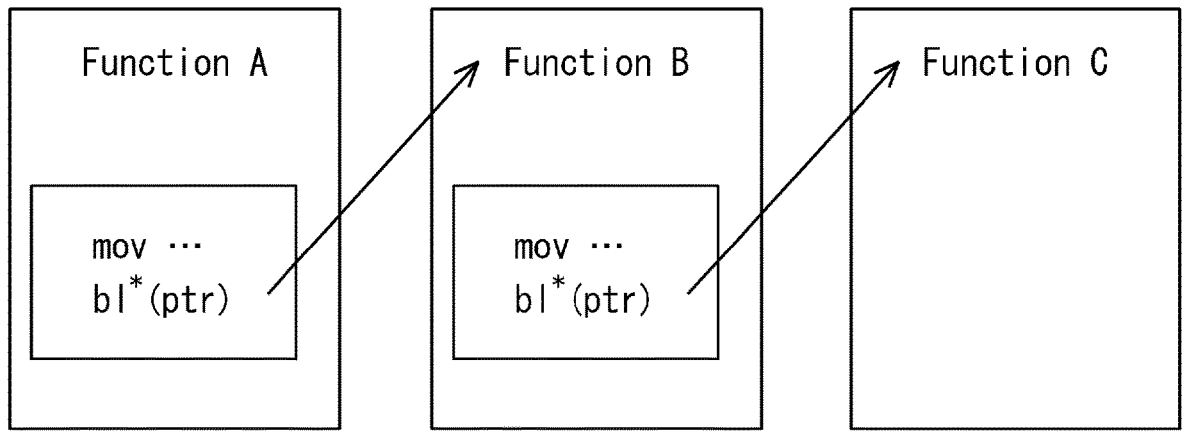
FIG. 5 is a diagram provided for explanation of a jump.
Figure 6:
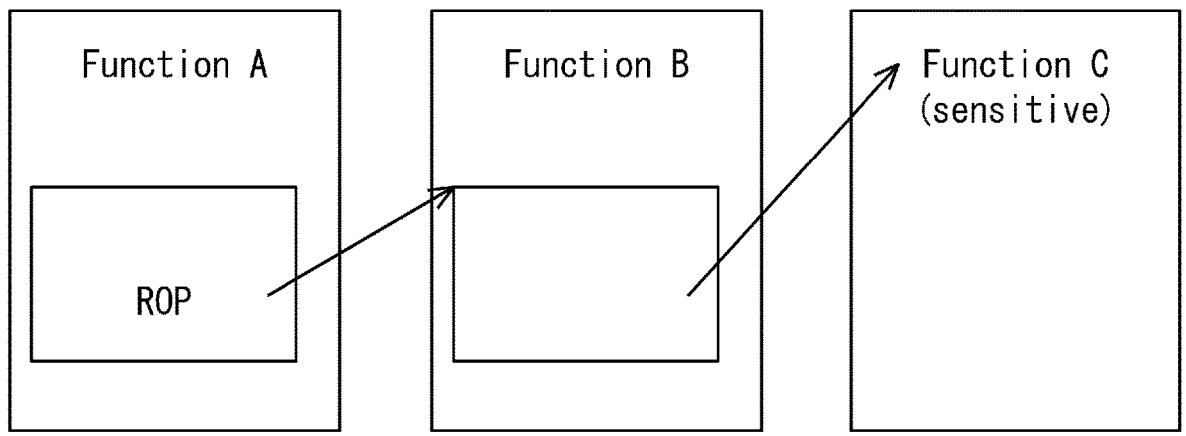
FIG. 6 is a diagram provided for explanation of a jump.

Here, when the process execution program is executed in the order of a function A, a function B, and a function C, usually, as shown in FIG. 5, a process jumps to a first address of the function B after the function A, and jumps to a first address of the function C after the function B. On the other hand, when the processing apparatus 10 is subjected to, for example, a ROP (Return-Oriented Programming) attack, for example, as shown in FIG. 6, the process jumps to an address other than the first address of the function B after the function A. It is thus possible to reliably identify a suspicious record (i.e., jump execution record corresponding to a jump from the function A to the function B in FIG. 6) by the security control unit 11B checking the jump history information based on the white address list information. FIGS. 5 and 6 are diagrams provided for explanation of a jump.

As described above, according to the second example embodiment, the security control unit 11B of the processing apparatus 10 identifies, as a suspicious record, a jump execution record that is included in the jump history information with a corresponding jump destination address not included in the white address information based on the white address information.

With the configuration of the processing apparatus 10, it is possible to reliably identify a suspicious record.

Third Example Embodiment

A third example embodiment relates to another example of a method for searching a "suspicious record". A configuration of the processing apparatus according to the third example embodiment is the same as that of the processing apparatus 10 according to the first example embodiment, and thus a description thereof will be described with reference to FIG. 1.

In the processing apparatus 10 according to the third example embodiment, the security control unit 11B identifies a suspicious record based on "valid path information". The "valid path information" is information (e.g., table) that defines a path in a process execution program for appropriately accessing a security-sensitive function. For example, the security control unit 11B identifies, as a suspicious record, a jump execution record included in the jump history information corresponding to an "invalid path" based on the "valid path information". The "invalid path" is a path that accesses a security-sensitive function and is different from a valid path, i.e., a path that accesses a security-sensitive function and is not included in the valid path information.

This valid path information can be obtained from a control flow graph (CFG). That is, for example, a developer of the process execution program creates a control flow graph by applying an analysis tool to the process execution program, and creates valid path information based on the control flow graph. This valid path information is held in the memory 12 of the processing apparatus 10 in advance.

Figure 7:
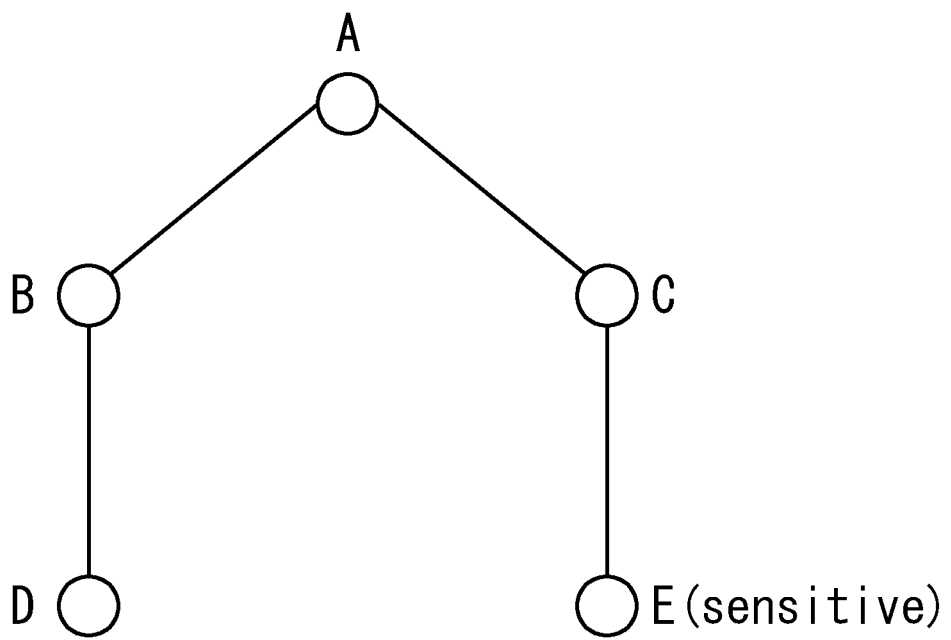
FIG. 7 is a diagram provided for explanation of valid path information according to a third example embodiment.

FIG. 7 is a diagram provided for explanation of the valid path information according to the third example embodiment. FIG. 7 shows an example of the control flow graph. In the control flow graph shown in FIG. 7, there is a path executed in the order of "function A-function B-function D" and a path executed in the order of "function A-function C-function E". Since the function E is a sensitive function, the path of "function A-function C-function E" is a valid path.

In this example, the valid path information includes information about the path of "function A-function C-function E". Here, the length of the valid path, i.e., the number of functions included in the valid path is three, but the present disclosure is not limited to this, and the number of functions included in the valid path may instead be two or more. In FIG. 7, parts indicated by circles (i.e., functions) can be referred to as nodes, and parts indicated by lines connecting the nodes corresponds to control flows.

With the above-described configuration of the processing apparatus 10, it is possible to identify an illegal path in consideration of a path up to a sensitive function.

Fourth Example Embodiment

A fourth example embodiment relates to another example of a method for searching a "suspicious record". A configuration of the processing apparatus of the fourth example embodiment is the same as that of the processing apparatus 10 of the first example embodiment, and thus a description thereof will be described with reference to FIG. 1.

In the processing apparatus 10 according to the fourth example embodiment, the security control unit 11B identifies an address of a gadget that is included in the process execution program and that can be used for a return-oriented-programming (ROP) attack. Here, the gadget means a small program with a single function. Then, the security control unit 11B identifies, as a suspicious record, a jump execution record included in the jump history information corresponding to the jump destination address that matches the identified gadget address. This makes it possible to efficiently identify a jump execution record that may be a ROP attack.

Other Example Embodiments

<1>In the processing apparatus 10 according to the first to fourth example embodiments, the security control unit 11B may hold the "jump history information" in a secure environment of the processing apparatus 10. This secure environment corresponds to a TEE (Trusted Execution Environment). For example, TEE is provided as Trust Zone in an ARM (Advanced RISC Machines) processor architecture, and is provided as SGX (Software Guard Extensions) in an Intel processor architecture.

Figure 8:
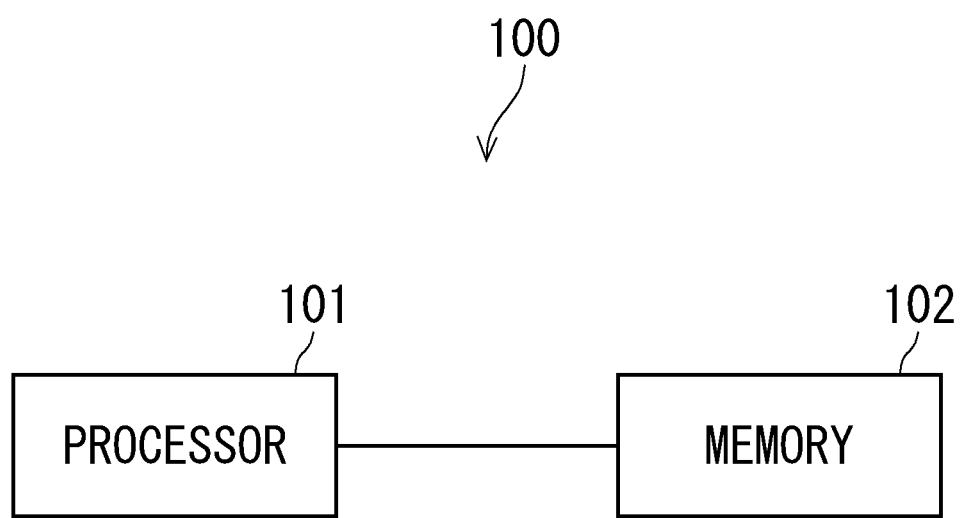
FIG. 8 shows a hardware configuration example of a processing apparatus.

<2>FIG. 8 shows an example of a hardware configuration of the processing apparatus. In FIG. 8, the processing apparatus 100 includes a processor 101 and a memory 102. The processor 101 may be, for example, a microprocessor, an MPU (Micro Processing Unit), or a CPU (Central Processing Unit). The processor 101 may include a plurality of processors. The memory 102 is composed of a combination of a volatile memory and a non-volatile memory. The memory 102 may include a storage located separately from the processor 101. In this case, the processor 101 may access the memory 102 via an I/O interface (not shown).

The processing apparatuses 10 according to the first to fourth example embodiments can have the hardware configuration shown in FIG. 8. The control unit 11 of the processing apparatus 10 according to the first to fourth example embodiments may be implemented by the processor 101 reading and executing a program stored in the memory 102. The memory 12 may be implemented by the memory 102. The program can be stored and provided to the processing apparatus 10 using any type of non-transitory computer readable media. Examples of non-transitory computer readable media include magnetic storage media (such as floppy disks, magnetic tapes, hard disk drives, etc.), and optical magnetic storage media (e.g. magneto-optical disks). Further examples of non-transitory computer readable medium include CD-ROM (Read Only Memory), CD-R, and CD-R/W. Further examples of non-transitory computer readable medium include semiconductor memories. Examples of semiconductor memories include mask ROM, PROM (Programmable ROM), EPROM (Erasable PROM), flash ROM, RAM (Random Access Memory), etc. The program may be provided to the processing apparatus 10 using any type of transitory computer readable media. Examples of transitory computer readable media include electric signals, optical signals, and electromagnetic waves. Transitory computer readable media can provide the program to the processing apparatus 10 via a wired communication line (e.g. electric wires, and optical fibers) or a wireless communication line.

Although the present disclosure has been described with reference to the example embodiments, the present disclosure is not limited to the above. Various modifications that can be understood by those skilled in the art can be made to the configuration and details of the present disclosure within the scope of the invention.

REFERENCE SIGNS LIST

10 PROCESSING APPARATUS
11 CONTROL UNIT
11A DETERMINATION UNIT
11B SECURITY CONTROL UNIT
12 MEMORY

What is claimed is:

1. A processing apparatus comprising:
at least one memory storing instructions; and
at least one processor configured to execute, according to the instructions, a process comprising:
determining whether a jump destination address of a jump instruction corresponds to an address region of security-sensitive functions based on sensitive address region information for defining the address region before execution of the jump instruction in a program being executed; and
when it is determined that the jump destination address does not correspond to the address region, executing control to allow the execution of the jump instruction and record a jump source address and the jump destination address of the jump instruction in jump history information as a jump execution record, whereas when it is determined that the jump destination address corresponds to the address region, searching for a suspicious record in the jump history information, the suspicious record being a jump execution record corresponding to an unusual jump destination address.

2. The processing apparatus according to claim 1, wherein the searching includes identifying, based on white address information for defining a first address in each function included in the program, a jump execution record included in the jump history information with a corresponding jump destination address not included in the white address information as the suspicious record.

3. The processing apparatus according to claim 1, wherein the searching includes identifying, based on valid path information for defining a valid path properly accessing each security-sensitive function, a jump execution record included in the jump history information corresponding to an invalid path as the suspicious record, the invalid path being a path accessing the security-sensitive function and that is different from the valid path.

4. The processing apparatus according to claim 1, wherein the searching includes identifying an address of a gadget included in the program and that can be used for a return-oriented programming attack, and identifying a jump execution record included in the jump history information corresponding to a jump destination address matching the identified address of the gadget as the suspicious record.

5. The processing apparatus according to claim 1, wherein the process further comprises
executing, when the suspicious record is found, control to stop executing the program.

6. The processing apparatus according to claim 1, wherein the process further comprises
executing control to store the jump history information in a TEE (Trusted Execution Environment) of the processing apparatus.

7. The processing apparatus according to claim 1, wherein the jump instruction is a function call instruction, a return instruction from a function call, or a calculated jump.

8. A security control method comprising:
determining whether a jump destination address of a jump instruction corresponds to an address region of security-sensitive functions based on sensitive address region information for defining the address region before execution of the jump instruction in a program being executed;
when it is determined that the jump destination address does not correspond to the address region, executing control to allow the execution of the jump instruction and record a jump source address and the jump destination address of the jump instruction in jump history information as a jump execution record; and when it is determined that the jump destination address corresponds to the address region, searching for a suspicious record in the jump history information, the suspicious record being a jump execution record corresponding to an unusual jump destination address.

9. A non-transitory computer readable medium storing a control program for causing a processing apparatus to execute processing including:

determining whether a jump destination address of a jump instruction corresponds to an address region of security-sensitive functions based on sensitive address region information for defining the address region before execution of the jump instruction in a program being executed;

when it is determined that the jump destination address does not correspond to the address region, executing control to allow the execution of the jump instruction and record a jump source address and the jump destination address of the jump instruction in jump history information as a jump execution record; and when it is determined that the jump destination address corresponds to the address region, searching for a suspicious record in the jump history information, the suspicious record being a jump execution record corresponding to an unusual jump destination address.

\* \* \* \* \*